Aug. 4, 1925.

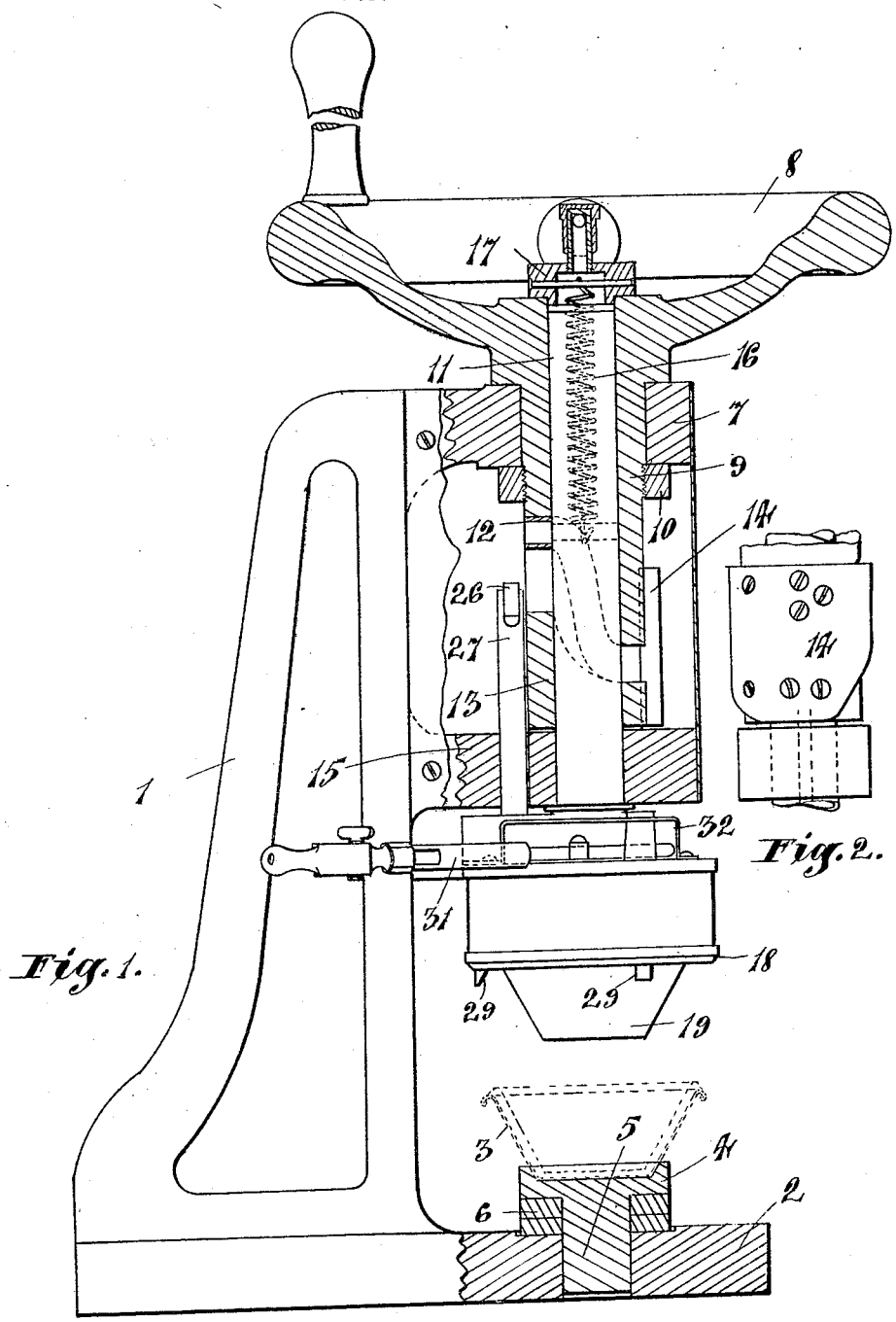

E. CHRISTIANSEN

PIE MOLDING MACHINE

Filed March 30, 1923

Ejnar Christiansen, Inv.
by C. A. Snow & Co. Attys.

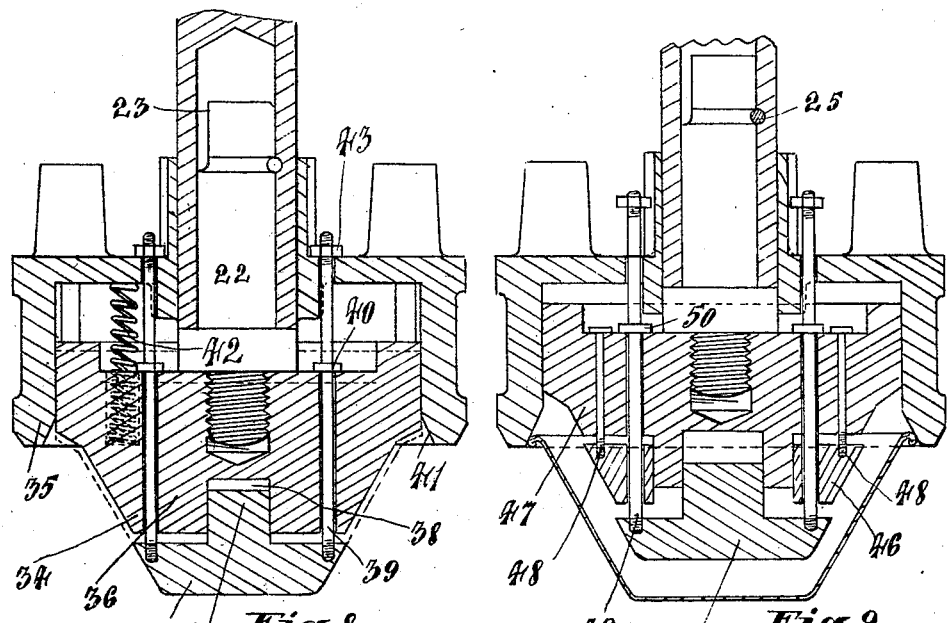

Patented Aug. 4, 1925.

1,548,659

UNITED STATES PATENT OFFICE.

EJNAR CHRISTIANSEN, OF BIRMINGHAM, ENGLAND.

PIE-MOLDING MACHINE.

Application filed March 30, 1923. Serial No. 628,897.

*To all whom it may concern:*

Be it known that I, EJNAR CHRISTIANSEN, a subject of the King of Denmark, residing at Birmingham, England, have invented certain new and useful Improvements in Pie-Molding Machines (for which I have filed applications in England dated February 28, 1922 (Patent No. 193,284), and September 14, 1922), of which the following is a specification.

This invention comprises certain improvements in or relating to means for molding in tins or molds pie casings or the like formed from dough or pastry, of the type in which the pastry is shaped in a tin or mold by means of a molding tool mounted on the end of a reciprocating spindle and in which the surplus material is removed by means of a cutter tool mounted axially of the molding tool and adapted to be automatically operated on each stroke of the molding tool spindle, this cutter tool also being adapted to bear upon the tin or mold at the commencement of the upward stroke of the molding tool to prevent the tin and pastry being lifted by the molding tool.

According to the present improvements the cutter tool is operated to remove the surplus material by means of a cam, the cam being also shaped to hold the cutter tool on the tin or mold at the commencement of the up stroke of the molding tool. The cutter tool is conveniently fitted to the molding tool so that such cutter tool and molding tool form a single unit which is detachably fitted to the end of the reciprocating spindle. In this latter construction conveniently three springs are fitted between the back of the molding tool and the cutter tool in order that the cutter will be normally forced into the inoperative position above the molding tool. The operative face of the cutter tool is of a conical shape for bearing on the edge of the tin or mold. In order that the cutter will not lift the pastry from the tin or mold when raised, spring pressed plungers may be fitted thereon, the spring pressed plungers remaining pressed on the edge of the tin until the cutter has been withdrawn from the pastry.

The reciprocating spindle is, in the hereinafter described embodiment, reciprocated by means of a cam concentrically mounted in relation to the spindle carrying the molding tool. The cutter tool carries a pin or member which is adapted to bear against a cam rotatably mounted about the axis of the said reciprocating spindle. By thus positioning the cam members, one rotation of a hand wheel or like member is adapted to effect the molding operation and the removal of surplus material.

According to the present improvements also the side surface of the molding tool is adapted to be withdrawn from the side of the molded pie casing in sections or gradually. Conveniently the molding tool is divided into horizontal sections, each section of which contacts with the side of the molded pie casing and each section is withdrawn one after the other commencing at the upper section. If the mold is divided into two sections the upper section is removed whilst the side of the lower section holds the side of the molded pie casing against the wall of the mold. The molding tool may be divided into any number of sections in accordance with the size of the pie casing to be molded. In another construction the molding tool may be formed in sections and may be covered by a sheath of rubber and the arrangement is such that when the molding tool first commences on the backward movement the parts thereof move in relation to one another which causes the angle of the conical rubber surface to vary to thus gradually move out of contact with the sides of the casing commencing at the top or commencing at the bottom, or from any other part according to the part of the molding tool which remains stationary.

Figure 1 is a side elevation of the machine constructed according to this invention, parts being shown in section.

Figure 2 is a view of the cam operating the cutter and fixing the two cam rings operating the molding tool.

Figure 6 is a development of the cam for operating the cutting tool.

Figure 7 is a development of the cam for operating the "former" tool or molding tool.

Figure 8 is a central cross sectional view of a modified form of molding tool according to this invention, and Figure 9 is a similar view to Figure 8 showing a further modified form of the molding tool.

Figure 3:
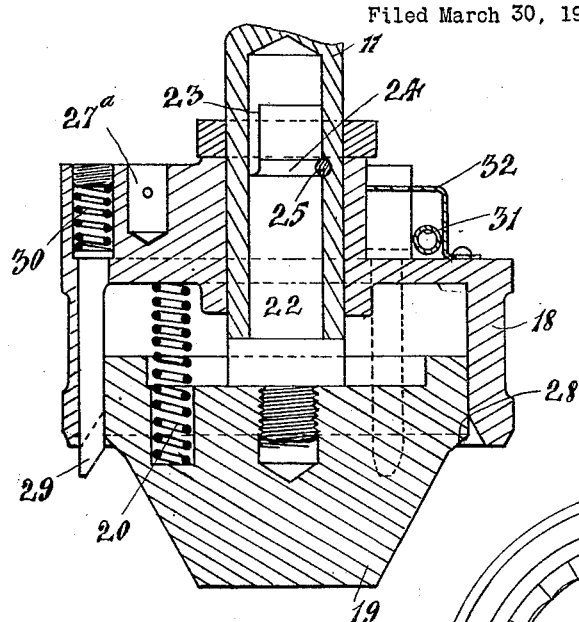
Figure 3 is a sectional elevation of the cutter and "former" or molding tool, the section being taken on line $x\ x$ of Figure 4.
Figure 5:
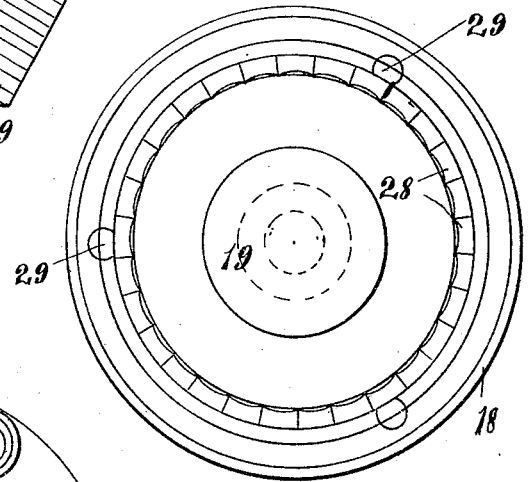
Figure 5 is an underside view of Figure 4.
Figure 4:
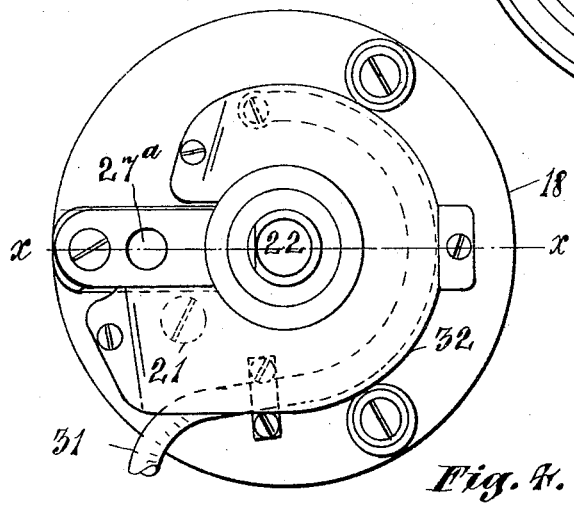
Figure 4 is a plan view of the parts shewn by Figure 3 detached from the press.

According to one form of the invention the machine comprises a frame 1 having a bed 2 projecting from the bottom, which bed receives the baking tin. The baking tin 3 is conveniently positioned by being placed in a recessed member 4 between which and the base a cushioning member is placed, the recessed member having a projection 5 thereon for entering the guiding recess in the machine frame. The cushioning member may comprise a rubber ring 6 or a spring. The top of the machine is provided with a forwardly horizontally projecting lug 7 and a hand wheel 8 is mounted on this lug to rotate about a vertical axis, a sleeve 9 on the hand wheel passing through a hole in the lug. This sleeve receives a screwed ring 10 which is screwed against a shoulder on the sleeve lying adjacent the underside of the said forwardly projecting lug, the hand wheel and sleeve being thus prevented from axial movement in the lug. A spindle 11 passes axially down the hand wheel and sleeve, such spindle having a truncated conical molding tool 19 fixed on the bottom. The bottom edge of the said sleeve 9 is cam shaped and is adapted to co-act with a roller 12 mounted on the end of a pin fixed to the spindle 11 so that as the hand wheel is rotated the spindle is moved downwards to press the molding tool into the baking tin and to allow the spindle to be again raised to its initial position during the one rotation of the hand wheel. A ring 13 having a correspondingly cam shaped top edge is fixed to the said sleeve so that the roller carried by the spindle runs in a groove, the ring being conveniently fixed to the sleeve by means of the cam 14 which is fixed by set screws to the sleeve and ring. The spindle carrying the molding tool passes through a second forwardly projecting lug 15 carried by the machine frame under the first mentioned lug, the spindle being keyed to this lower lug to prevent rotation of the spindle. In this embodiment the spindle 11 is returned to its raised position by means of a spring 16 which is anchored at its upper end to a ring 17 rotatably mounted on the boss of the hand wheel, the lower end of the spring being anchored to a pin fixed to the spindle. The roller 12 is adapted to co-act with the surface 9ª of the sleeve 9 for moving the spindle down, whilst the portion 9ᵇ of the cam is shaped to allow the spring 16 to return the spindle into the raised position. A cutter tool 18 is mounted on the spindle immediately above the molding tool 19, such cutter tool having a recess therein for receiving a cylinder base part of the molding tool. Spiral springs 20, conveniently three, are let into recesses in the base of the molding tool and normally press the cutter tool axially above the operative part of the "former" or molding tool 19. A screw 21 passes through the top of the cutting tool and screws into the "former" tool 19, the head of such screw 21 limiting the outward movement of the tool 18. The tools 18 and 19 are conveniently detachably fitted to the spindle 11 and for this purpose a pin 22 is screwed into the tool 19. This spindle is flattened at 23 and has a groove 24 therearound which enables this pin 22 to be locked on the transverse pin 25 fixed to the spindle 11. By this construction therefore varying shapes and sizes of pie casings could be made by one machine by providing a set of tools 18 and 19 of the required shape and size. The cam 14 is adapted to co-act with the roller 26 mounted on the end of a pin 27, the lower end of which is fixed in the recess 27ª in the cutting tool by means of a split pin. This pin 27 is slidably mounted through a hole in the lug 15. This cam 14 is so shaped and located that after the molding tool has reached the bottom of its stroke the cutting tool is moved down to cut away the surplus material pressed out from the tin. The molding tool is then withdrawn whilst the cutting tool remains at the bottom of its stroke which ensures that the pie casing will not stick to the molding tool and be lifted from the tin. The annular bottom face 28 of the cutting tool is bevelled upwardly which gives an angular shape to the top edge of the pie crust. This bevelled face may also be serrated or have other markings thereon to mark the edge of the pie crust.

In order that the pie casing will not stick to the cutter tool 18 ejector pins or plungers 29, conveniently three, are slidingly fitted to lie flush with the interior surface of the cutter 18, such pins being normally pressed outwardly by means of the springs 30. When therefore the cutter 18 moves upwardly the pins 29 will bear on the edge of the tin and pie casing and thus prevent any sticking to the cutting tool.

The tools 18 and 19 may be also heated slightly to ensure that the pie casing will not stick to the tools, and conveniently for this purpose a gas pipe 31 may be fixed to the top of the cutter 18, such pipe having a number of holes therein from which the flame passes. A plate 32 may be fixed above the pipe to ensure that the heat of the flames will be passed to the tools.

According to a modified form of molding tool as shewn by Figure 8 such molding tool 34 is divided into two sections 36 and 37. The lower section 37 is axially movable in relation to the section 36 for which purpose the pin 44 fixed to the section 37 is slidably mounted in the recess 38 in the section 36. The pins 39 are fixed at one end to the section 37 and pass through holes in section 36, collars 40 limiting the axial movement of the sections of the molding tool. The pins 39 also secure the cutter tool 35 to the tool 34. With this construction therefore the upper section 36 is first withdrawn from the molded pie casing and then the section 37 is withdrawn. When the section 36 is withdrawn the sides of the section 37 hold the side of the pie casing against the side wall of the tin or mold. As the cutter tool 35 remains pressed on the edge of the tin or mold whilst the mold 34 is withdrawn the bevelled edge 41 will bear on the correspondingly bevelled edge of the pie casing and thus further assist in preventing the pie casing from sticking to the molding tool 34. When the cutter tool 35 is raised from the tin or mold the springs 42 will cause such cutter tool to press against collars or nuts 43 and thus raise the portion 37 against the portion 36.

In the construction shown by Figure 8 the pins 39 may be an easy fit in the holes in the section 36 so that air may be passed down such holes when the section 36 is withdrawn from the section 37. In order that the projection 44 may freely slide in the recess 38 a flat may be formed on the projection 44 to allow air to freely flow into or from the bottom of the recess 38.

According to a modified form of this invention as shown by Figure 9 the molding tool is formed in three sections 45, 46 and 47. In this construction the section 47 will first be withdrawn from the molded pie casing and during such movement such section 47 will slide on the pins 48 fixed to the section 46. When the section 47 moves against the heads of the pins 48, the section 46 will then be withdrawn. The pins 49 are fixed to the lower section 45 and when the section 47 moves against the collars 50 the section 45 will be withdrawn. In this construction the side wall of the molding tool is withdrawn from the side wall of the pie casing in three successive parts.

Claims:

1. A machine for the manufacture of pie casings or the like comprising a frame, a spindle adapted to reciprocate therein, a molding tool which is divided into horizontal sections, each section of which contacts with the side of the molded pie casing, and means for withdrawing the upper section or sections and leaving the sides of the bottom section to hold the side of the molded pie casing against the wall of the mold.

2. A machine for the manufacture of pie casings or the like comprising a frame, a spindle adapted to reciprocate therein, a molding tool which is divided into horizontal sections, each section of which contacts with the side of the molded pie casing, means for withdrawing the upper section or sections and leaving the sides of the bottom section to hold the side of the molded pie casing against the wall of the mold, pins fixed to the under section or sections and slidably engaged through the upper section, and stops on the pins so that the upper section will raise the under section or sections.

3. A machine for the manufacture of pie casings or the like comprising a frame, a spindle adapted to reciprocate therein, a molding tool which is formed in sections, means for withdrawing the molding tool from the pie casing so that a part of the side surface of such tool leaves the side surface of the pie casing whilst other parts of the side surface of the molding tool are in contact with the side of the pie casing, a cutter tool mounted concentric with the molding tool and spring pressed plungers mounted on the cutting tool for bearing on the edge of the pie tin or mold and pie casing at the commencement of the return or upstroke of the cutter tool.

In witness whereof I have signed this specification in presence of two witnesses.

EJNAR CHRISTIANSEN.

Witnesses:
J. E. S. ROCKWOOD,
H. S. HARDAKER.